United States Patent
Reichenbach et al.

(10) Patent No.: US 7,028,903 B2
(45) Date of Patent: Apr. 18, 2006

(54) METHOD FOR OPERATING OPTICAL SENSORS

(75) Inventors: Juergen Reichenbach, Emmendingen (DE); Carl Joseph Hafner, Emmendingen (DE); Peter Hauser, Freiburg (DE); Christiane Fillhardt, Schutterwald (DE)

(73) Assignee: Sick AG, Waldkirch (DE)

( * ) Notice: Subject to any disclaimer, the term of this patent is extended or adjusted under 35 U.S.C. 154(b) by 34 days.

(21) Appl. No.: 10/422,980

(22) Filed: Apr. 23, 2003

(65) Prior Publication Data

US 2004/0026509 A1  Feb. 12, 2004

(30) Foreign Application Priority Data

Apr. 25, 2002  (DE) ................... 102 18 452

(51) Int. Cl.
*G02B 26/08* (2006.01)

(52) U.S. Cl. .............. 235/462.25; 235/462.1; 235/462.11; 235/462.41

(58) Field of Classification Search .......... 235/462.05, 235/462.1, 462.11, 462.25, 462.41, 436, 439, 235/472.01, 472.02, 454; 382/232

See application file for complete search history.

(56) References Cited

U.S. PATENT DOCUMENTS

| | | | |
|---|---|---|---|
| 5,016,107 A * | 5/1991 | Sasson et al. | 348/231.1 |
| 5,479,210 A * | 12/1995 | Cawley et al. | 348/390.1 |
| 5,703,349 A | 12/1997 | Meyerson et al. | |
| 5,793,033 A | 8/1998 | Feng et al. | |
| 5,818,028 A | 10/1998 | Meyerson et al. | |
| 6,019,286 A | 2/2000 | Li et al. | |
| 6,715,686 B1 * | 4/2004 | Fahraeus | 235/462.45 |
| 2002/0051236 A1 * | 5/2002 | Nakamura | 358/467 |
| 2003/0215147 A1 * | 11/2003 | Reichenbach et al. | 382/232 |

FOREIGN PATENT DOCUMENTS

WO  WO 95/07000 A1  3/1995

* cited by examiner

*Primary Examiner*—Daniel Stcyr
*Assistant Examiner*—Daniel A. Hess
(74) *Attorney, Agent, or Firm*—Townsend and Townsend and Crew LLP

(57) ABSTRACT

A method for operating optical sensors, particularly code readers, which have a light receptor that receives light reflected and/or returned from an object. A picture is generated from the received light and the content of the picture, such as a code, is read. At least some pictures are compressed with a picture compression algorithm of the sensor. To improve the operation of such optical sensors, especially code readers, and to improve the analysis of error detection from knowing the causes for errors, only pictures which have error information are compressed and stored. The code reader is constructed to perform these functions.

15 Claims, 2 Drawing Sheets

METHOD FOR OPERATING OPTICAL SENSORS

BACKGROUND OF THE INVENTION

The present invention relates to optical sensors, and especially to optical code readers, and to a method for operating such sensors, which involves receiving reflected light with a light receptor, generating a picture therewith, reading the picture (code) and compressing at least some of the pictures with a picture compression algorithm.

Code readers read codes, such as one-dimensional bar codes or two-dimensional matrix codes, and they operate according to a variety of principles. Code readers which employ the scanner principle read the code by scanning a light beam over the object in question, for example a label carrying a bar code. Light reflected or returned by the object is received by a light receptor and converted into electronic signals. Bar code information is derived from amplitude information of the electric signals.

Two-dimensional codes are typically read with code readers that operate on the camera principle. The object in question is illuminated with surface lighting or line-like light fields and results in light that is reflected or returned by the object and received by a one- or two-dimensional receiver array, for example a CCD or CMOS line or matrix sensor. By making use of the amplitude differences of the received pixels, the code and therefrom code information can be derived.

U.S. Pat. No. 5,703,349 discloses a portable code reader which compresses received pictures prior to further processing them to facilitate, for example, their wireless transmission.

Depending on the code quality, the degree of contrast the code contains, as well as any damage or soiling to which the code was subjected, can lead to error readings. Such incorrectly read data is typically immediately discarded because it is not useful. However, without the erroneously read data it is difficult to diagnose what led to the errors in the first place.

SUMMARY OF THE INVENTION

In view of the foregoing, it is an object of the present invention to provide an improved method for operating optical sensors, particularly code readers, and to provide a code reader which can be used in such a method. The present invention improves the error analysis by providing information about what caused the errors so they can be used to improve the rate with which errors can be detected.

In general, this object is attained by compressing and storing only those pictures of the scanned object, e.g. a bar code, that are the result of an error reading.

In accordance with the invention, pictures viewed by the sensor are read and they are further processed depending on the results of the readout. In this manner, correctly read pictures can be deleted after they have been read, that is, after they have been decoded and the read data has been released. Pictures which contain error readings, for example in which the code could not be read, are compressed and stored. However, what is stored is not the erroneous information, but the entire picture that was viewed by the sensor and led to the error reading.

Although picture compression as such is generally known, it provides significant advantages in the context of the present invention, particularly for detecting one- and two-dimensional codes, because the compressed pictures require only little memory space so that several pictures which led to error readings, so-called NOREAD-pictures, are readily stored. The presence of a series of NOREAD-pictures, for example 20 to 30, in the memory makes effective error analysis possible. This in turn improves the error recognition rate of the sensor, which makes it easier to correct errors. Thus, it is, for example, possible to adapt the algorithm for reading codes to codes which are difficult to read.

Although picture compression normally leads to the loss of some information, it turns out that for the error analysis envisioned by the present invention, the information loss is acceptable and the compressed pictures remain useful for error analysis.

The NOREAD-pictures can be temporarily or permanently stored so that they can be accessed, for example via an appropriate interface, for subsequent analyses. Such analyses, for example, can be performed locally or via the internet over long distances.

With picture compression, reference codes can be stored and compared with test codes for optimizing filters that are employed. In addition, picture data from the read codes can be transmitted better and more quickly to a processing unit via a bandwidth limited interface. This is particularly advantageous for long-distance analyses via computer networks.

The present invention can also be advantageously used with other optical sensors such as laser scanners for measuring and/or recognizing objects, as is incorporated, for example, in the LMS instruments distributed by SICK AG of Waldkirch, Germany, the assignee of this application. Such scanners can be used, for example, at toll stations for classifying vehicular traffic.

Here too the error analysis can be simplified by employing code readers and storing compressed, misread pictures as generally described above.

The present invention can be used with a variety of optical sensors, such as the earlier mentioned code readers and laser scanners. Further, a variety of different sensing technologies can be employed, such as line sensors and matrix sensors of the CMOS or CCD variety.

The pictures that are processed in accordance with the present invention can be color pictures, gray-scale pictures or binary pictures (black/white), as well as distance pictures from the earlier mentioned LMS instruments, which identify distances in the picture as gray-scale or color values. They can be transmitted over a variety of interfaces such as, for example, serial, asynchronous, etc. interfaces of the sensors, and they can use a variety of protocols, including Ethernet, TCP-IP, ftp, etc.

By including information of the surroundings of the object, such as white borders in the compressed picture of the object to be read, such as a bar code or a two-dimensional code, an improved error analysis is possible because a non-reading of the code might be caused by the surroundings and is not necessarily caused by the code itself.

The present invention further contemplates that when the memory is full, currently misread, compressed pictures are stored by deleting the oldest previously stored picture. In this manner, the last misread pictures are always stored so that the error analysis is always done with the most recently acquired pictures.

It is advantageous to use as the compression method a process generally known under the designation JPEG or JPEG 2000.

In a refinement of the present invention, the degree or extent of compression is adjustable. This permits adapting the degree of compression to the encountered circumstances so that in each instance the highest possible, still acceptable degree of compression can be used, which ultimately saves memory space and speeds up data transmissions.

It is particularly advantageous when the degree of compression is automatically selected by the sensor, depending on certain parameters, such as the decodability of the compressed picture, the available storage media, or the bandwidth of the transmission channel, by having the sensor itself determine the acceptable degree of compression.

It has been found that a compression ratio of between 20 to 50 provides good results; that is, following compression and, if necessary, decompression, sufficient information is retained to conduct the error analysis. A compression ratio of 50 is often usable for visually evaluating the pictures for obvious printing errors, a damaged code label, or possibly a lost label, which are responsible for NOREAD-pictures. When the printing of the code or the surroundings of the code is responsible for a NOREAD-picture, the picture compression ratio may have to be lowered to permit a meaningful analysis.

A code reader made in accordance with the present invention has a light receiving unit, a picture generating device, a processing and evaluation unit for reading the content of the picture, and a picture compression unit as well as an error analysis unit where incorrectly read and compressed pictures are processed. All components of the code reader can be integrated into at least one common housing. In a further development, the code reader of the present invention includes a memory unit for storing the compressed pictures.

DESCRIPTION OF THE PREFERRED EMBODIMENTS

Figure 1:
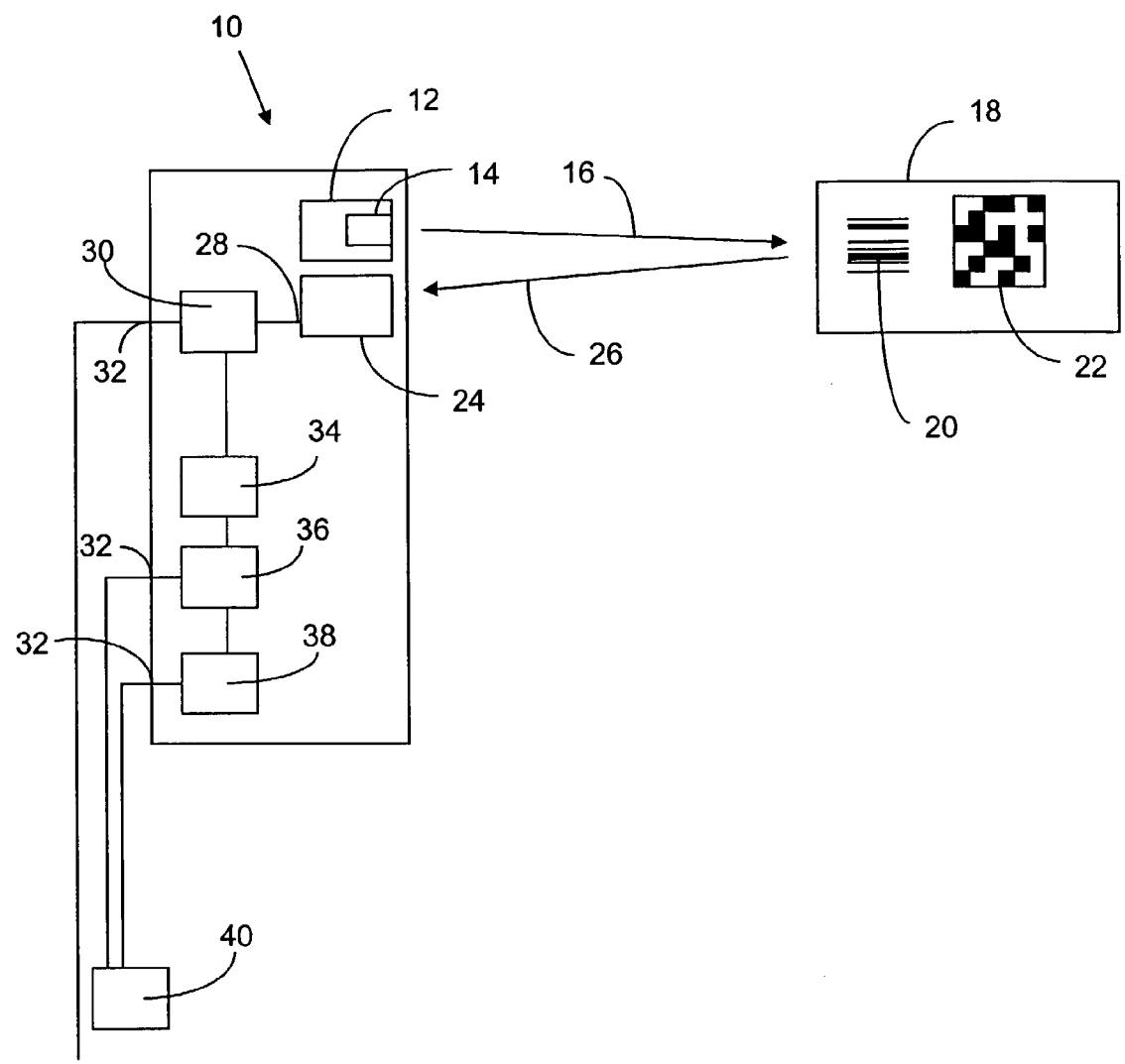
FIG. 1 schematically illustrates the code laser of the present invention.
Figure 2:
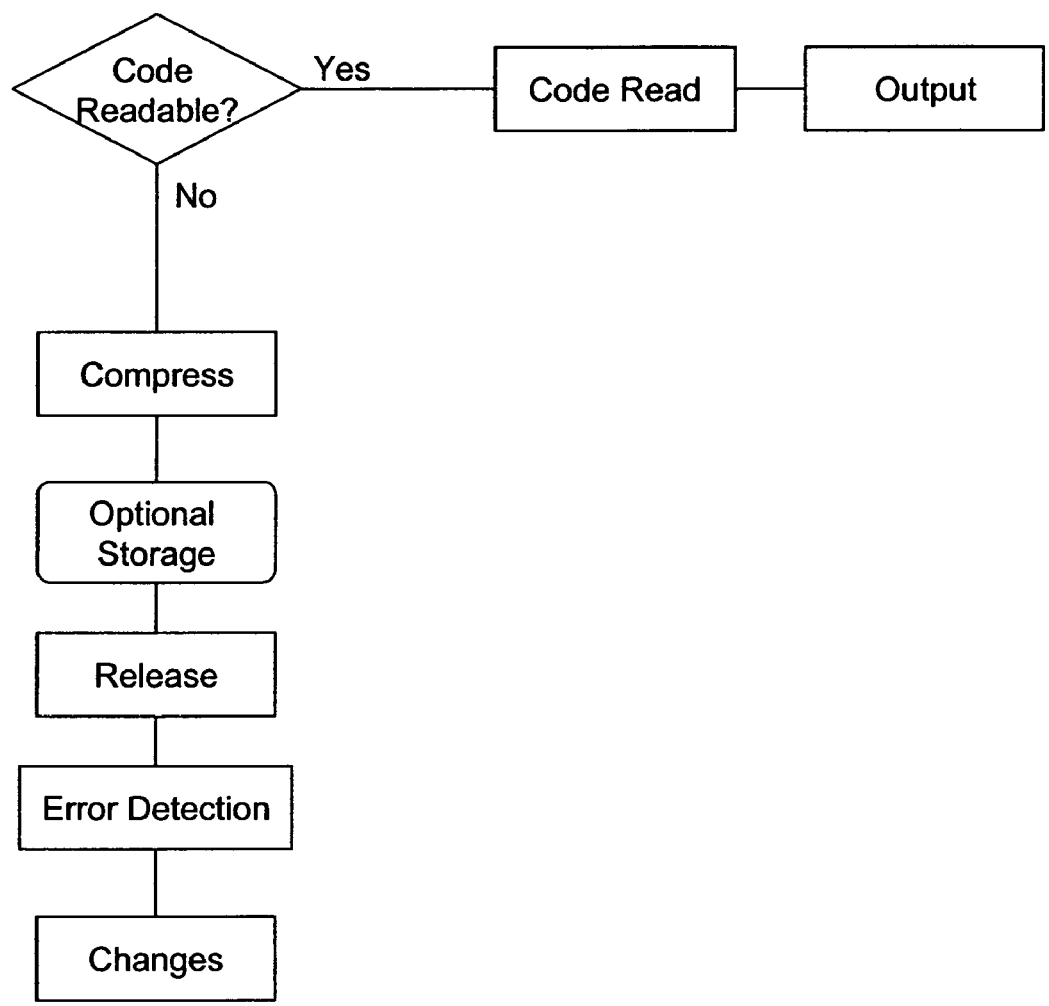
FIG. 2 is a flow diagram illustrating the method of the present invention.

Referring to FIG. 1, a code reader 10 constructed in accordance with the present invention has a light emitter 12 with a light source 14 that emits a light beam 16. Light beam 16 illuminates an object 18 that carries a code 20 or 22. The code can be a one-dimensional bar code schematically illustrated at 20 or a two-dimensional code 22. Other codes, such as color codes, for example, can also be employed. To completely cover code 20 or 22 with light beam 16, code reader 10 has a light deflecting device (not separately shown) which scans the light beam over codes 20 or 22.

Light beam 16 can be linearly focused on object 18 so that, for one-dimensional codes 20, it illuminates the entire length of the code or, for two-dimensional code 20, so that the code is completely scanned by line-shaped light beam 16.

Code reader 10 further has a light receptor 24 which receives light 26 reflected by and/or returned from object 18. Light receptor 24 typically has its own optics. Light receptor 24 converts the received light into an electrical signal which is available at output 28 for further processing.

Light receptor 24 preferably also has a one-dimensional receiving array (not further shown) so that the illuminated area of the object can be completely reproduced by the receptor. The receiving array can be a line sensor or a two-dimensional matrix sensor of the CCD or CMOS type.

Code reader 10 can also be a camera. In such a case, the code reader only has a light emitter 12 and a light receptor 24. The code can be illuminated with external lighting.

Electrical signals which correspond to the received light are fed to a processing unit 30, where code 20 or 22 is read and decoded. Information contained in code 20 or 22 is transmitted via an appropriate interface 32.

If the code cannot be read, the electric signals are transmitted to a picture generator 34 which produces a picture from code 20 or 22 viewed by sensor 10. It is of course also possible to generate a picture when the code has been correctly read should this be useful or desirable.

In accordance with the invention, the picture that has been generated is transmitted to a picture compression unit 36 where it is compressed with a compression algorithm. Compression algorithms identified as JPEG or JPEG 2000 have been particularly useful and advantageous for this purpose.

The compressed picture can be further transmitted, for example via interface 32, or it can be stored in a memory 38 for possible later transmission via interface 32.

Memory 38 can be incorporated in the sensor and stores the data either temporarily in a RAM or permanently in a Flash-Prom. Alternatively, the memory can be separate from the sensor and can, for example, be a hard disc. Memory 38 can be of the "first in, first out" type, which always stores the most recent compressed pictures while the oldest stored pictures are deleted or written over when memory space has run out. In this manner, the most recently viewed pictures are always stored.

Any desired interface, such as serial, parallel, asynchronous, etc. interfaces can be used. Further, a variety of protocols such as Ethernet, TCP/IP or the like can be used.

As already mentioned, pictures which contain an error reading can be transmitted to an error detecting unit 40 via interface 32. The error detecting unit 40 can form part of or be separate of the sensor. The present invention is particularly useful for long-distance error analyses, for example via the wide area networks such as the internet.

The error detecting unit analyzes the compressed picture and determines the encountered errors, which can be used for improving the error detection rate.

What is claimed is:

1. A method of reducing errors when reading optical codes associated with respective objects comprising providing a light receptor; directing light returned from one of the objects onto the light receptors; generating a picture of the object with light received by the light receptor; identifying acquired pictures for which a code could not be read; compressing said acquired pictures for which a code could not be read with a compression algorithm; storing a plurality of the compressed pictures for which a code could not be read; and analyzing data contained in the plurality of stored pictures for determining encountered errors for use in reducing overall code reading errors.

2. A method according to claim 1 wherein generating the picture comprises including in the picture information about surroundings of the code.

3. A method according to claim 1 including an optical sensor for generating the pictures and temporarily storing the compressed pictures in the sensor.

4. A method according to claim 1 including an optical sensor for generating the pictures and permanently storing the compressed pictures in the sensor.

5. A method according to claim 1 wherein storing the compressed pictures comprises storing the pictures in a memory, and wherein storing a most recent, compressed picture includes deleting from the memory an oldest previously stored compressed picture.

6. A method according to claim 1 including an optical sensor for generating the pictures and accessing the compressed, stored pictures from a location remote from the sensor.

7. A method according to claim 1 wherein compressing the pictures comprises compressing the pictures with at least one of compression techniques identified as JPEG and JPEG 2000.

8. A method according to claim 1 including adjusting a degree to which the pictures are compressed.

9. A method according to claim 8 wherein adjusting comprises automatically adjusting with the sensor the degree of compression in dependence on predetermined parameters.

10. A method according to claim 8 wherein adjusting comprises compressing the pictures by a factor of about 50:1 for obvious errors and by a factor of no more than 20:1 for detailed pictures and for analyzing detailed errors.

11. A method according to claim 8 wherein adjusting comprises varying a compression ratio by between about 20:1 to about 50:1.

12. A method according to claim 1 including transferring pictures for which a code could not be read to an error detecting unit, and analyzing the detected errors in the error detecting unit.

13. A method according to claim 1 wherein the code comprises a one-dimensional bar code.

14. A method according to claim 1 wherein the code comprises a two-dimensional matrix code.

15. Apparatus for reducing errors when reading optical codes associated with objects comprising a processing unit for reading the codes associated with the objects and identifying objects for which a code could not be read, a picture generator operatively coupled with the processing unit for generating a picture of at least portions of objects for which a code could not be read, a picture compression unit operatively coupled with the picture generator for compressing the pictures for which a code could not be read, a memory for storing compressed pictures for which a code could not be read, and an error detecting unit for analyzing at least one of the compressed pictures and determining the source of encountered code reading errors for use in reducing overall code reading errors.

* * * * *